Patented Sept. 5, 1950

2,521,495

UNITED STATES PATENT OFFICE 2,521,495

CARBONACEOUS ARTICLES AND
PRODUCTION THEREOF

Harley A. Wilhelm, Ames, Iowa, and Park S. Gerald, Omaha, Nebr., assignors to the United States of America as represented by the United States Atomic Energy Commission No Drawing. Application April 16, 1945,
Serial No. 588,712

6 Claims. (Cl. 18—47.5)

This invention relates to the formation of carbon articles, and more particularly to a suitable binder mixture for shaped and bonded carbon articles.

In the manufacture of bonded carbon articles, such as crucibles and the like, the accuracy of the shaping of the articles is of importance. Under present known methods, bonded carbon articles are generally obtained by melting a fusible carbonaceous substance mixed with powdered graphite, lamp black, charcoal or similar carbonaceous material so that the carbonaceous substance acting as a bonding agent softens and binds the graphite particles together. The desired shape is given to the article after the bonding agent is softened by heat either by pressing the mass in a mold or by pouring it into a mold. After softening and shaping, the article is further heated to coke the carbonaceous binder, leaving a rigid article. Thus the actual shaping of the article to be produced depends upon the application of heat for the softening of the binder and for the bonding of the carbon particles. The bonding agent is of such a nature that when heated it imparts a fluidity to the mass of carbon particles, which fluidity permits the carbon particles and the binder to be formed into a desired shape. Binders such as coal tar or pitch, which are nonadhesive solids at room temperature, are generally used. One prior mode of shaping the carbon article consists of pressing and heating the mixture of powdered carbon particles and a fusible carbonaceous substance in a mold until the carbonaceous substance, which acts as a bonding agent, softens and bonds the carbon particles together. In another prior mode of shaping the carbon article, the carbon particles and the binder are heated and poured into a mold of the desired shape. After the shaping, the molded article is then heated until the carbonaceous bonding agent cokes, leaving the nonvolatile residue as a cement holding the carbon particles together.

Not infrequently difficulty has been encountered in prior shaping processes because of the elevated temperatures used and because in general such processes required the use of a closed mold thereby precluding the use of manual shaping operations which are frequently advantageous in production of complex shapes and avoidance of flaws in the final product. These difficulties often result in production of inferior carbonaceous articles.

In accordance with the present invention many of the difficulties encountered in prior processes have been eliminated and a method has been provided whereby production of shaped carbonaceous articles is substantially simplified. As herein contemplated a carbonaceous article is produced by shaping a carbonaceous mixture which is coherent and plastic at or about room temperature comprising carbon in a pulverulent state, a solid fusible coking binder such as powdered pitch or coal tar rosin or shellac which is adhesive at an elevated temperature and a further carbonaceous binder which is adhesive at or about room temperature and coking the resulting product. Such a process permits manual or other special shaping operations and in many cases permits production of a shaped article with but a single mold. A plastic carbonaceous composition suitable for use in accordance with the present invention may comprise carbon particles such as lampblack, powdered graphite, charcoal or the like; a coking binder which softens and becomes adhesive at a temperature of about 100° C. to 300° C., such as coal tar, pitch, asphalts, rosin, etc. and a natural gum such as gum tragacanth, cedar gum or angico gum. Such gums are rendered adhesive by incorporation of a solvent or swelling agent such as water. The gum or other adhesive agent may be incorporated into the mixture in liquid state, as a solution, or as an emulsion with a liquid that readily evaporates such as water. The use of a fluid gum gives the mixture of carbon and binder moldability, sticks the carbon particles together, and without heating, stiffens the mass upon the drying of the fluid gum at low temperature. Other adhesive agents which are adhesive at room temperature such as nitrocellulose, cellulose acetate or rubber or resinous adhesives or glue are suitable for this purpose.

In our preferred process, powdered carbon, such as graphite, is mixed with a binding agent of some fusible carbonaceous substance such as coal tar or pitch also in powder form. This mixture is then made into a paste by mixing a fluid gum or other similar adhesive therewith. This fluid adhesive should have high adhesive qualities at room temperature, and its mucilaginous character therefore holds the carbon and binder particles together in the form of a paste. This paste has good moldability when wet, and is firm or set when dry, so that it can be easily shaped and yet hold its form on slanting or during the coking operation without support from the mold. After the carbon-pitch-gum mixture is molded, the shaped article may be subjected to a heat that melts and subsequently cokes the fusible carbonaceous substances, i. e., pitch, and bonds the carbon particles together more firmly. This coking may be affected while the bonded article is in the mold or after it is removed. The heating of the molded articles is then continued until the carbonaceous substances "coke." Such a process permits formation of more complex shapes, minimizes production of defective products and frequently permits use of but a single mold where a pair of mating molds might otherwise be required.

The following specific example, which is not to be construed as limiting, illustrates the preparation of a bonded carbon article by our preferred process.

Powdered graphite and powdered coal tar pitch in the ratio of 3 parts of graphite to 1 part of pitch by weight are mixed with a suspension of gum tragacanth with an amount of water just sufficient to form a thick paste. The paste is then pressed into the desired shape in a mold and the shape is set by drying, preferably at about room temperature. The shaped article is then in a stable relatively firm condition and may be set aside for an indefinite period. To bind the particles together more firmly, the article may be heated to temperatures of the order of red heat to soften the pitch and fuse the mass, after which the volatile matter in the composition is driven off by further heating, and the article coked.

Although the present invention has been described with reference to the specific details of certain embodiments thereof, such details should not be regarded as limitations upon the scope of the invention except insofar as included in the accompanying claims.

We claim:

1. The method of making a bonded carbon article comprising mixing carbon, a fusible carbonaceous substance and a natural gum, forming the mixture into an article of desired shape, and subsequently heating said shaped article to coke said fusible carbonaceous substance and said natural gum thereby bonding the carbon.

2. The method of making a bonded carbon article comprising mixing carbon, a fusible carbonaceous substance and a gum resin, forming the mixture into an article of desired shape, and subsequently heating said shaped article to coke said fusible carbonaceous substance and said gum resin thereby bonding the carbon.

3. The method of making a bonded carbon article comprising mixing carbon, a fusible carbonaceous substance and gum tragacanth, forming the mixture into an article of desired shape, and subsequently heating said shaped article to coke said fusible carbonaceous substance and said gum tragacanth thereby and bonding the carbon.

4. A bonded carbon article of desired shape comprising carbon particles bonded by a carbonized fusible carbonaceous substance and a carbonized gum.

5. A shaped carbonaceous article comprising a shaped plastic mixture of carbon particles, a solid fusible carbonaceous substance, and a moistened gum binder that is adhesive at room temperature.

6. A shaped carbonaceous article comprising a shaped mixture of about three parts carbon particles, one part fusible carbonaceous substance, said parts being by weight, and an amount of gum tragacanth sufficient to maintain said shaped mixture in the desired shape.

HARLEY A. WILHELM.
PARK S. GERALD.

REFERENCES CITED

The following references are of record in the file of this patent:

UNITED STATES PATENTS

| Number | Name | Date |
|---|---|---|
| 166,433 | Weston | Aug. 3, 1875 |
| 431,968 | Goodwin | July 9, 1890 |
| 1,559,275 | Myler | Oct. 27, 1925 |
| 1,674,961 | Diamond | June 26, 1928 |
| 1,733,866 | Crossley | Oct. 29, 1929 |
| 1,868,646 | Wallace | July 26, 1932 |
| 1,955,936 | Wallace | Apr. 24, 1934 |
| 2,111,708 | Van Amstel | Mar. 22, 1938 |